US006824336B2

(12) United States Patent
Izutsu et al.

(10) Patent No.: US 6,824,336 B2
(45) Date of Patent: Nov. 30, 2004

(54) METHOD FOR CONTROLLING CUTTING MACHINE

(75) Inventors: Yukio Izutsu, Hiroshima (JP); Mitsuki Nishimoto, Hiroshima (JP); Tsuyoshi Hosoda, Hiroshima (JP); Atsushi Ohta, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 120 days.

(21) Appl. No.: 10/027,630

(22) Filed: Dec. 21, 2001

(65) Prior Publication Data

US 2002/0164221 A1 Nov. 7, 2002

(30) Foreign Application Priority Data

Dec. 28, 2000 (JP) ........................................ 2000-402444

(51) Int. Cl.[7] .............................. B23C 1/00; B23Q 15/08
(52) U.S. Cl. ........................ 409/132; 409/84; 409/196; 700/188; 700/174; 700/171
(58) Field of Search ............................ 409/132, 84, 79, 409/80, 117, 187, 194, 196, 201; 700/188, 184, 182, 174, 171

(56) References Cited

U.S. PATENT DOCUMENTS

| 4,791,342 A | * | 12/1988 | Okamoto | 700/188 |
| 5,090,851 A | * | 2/1992 | White | 409/201 |
| 5,200,680 A | * | 4/1993 | Sasaki et al. | 318/571 |
| 5,321,346 A | * | 6/1994 | Matsumura et al. | 700/184 |
| 5,508,596 A | * | 4/1996 | Olsen | 700/174 |
| 5,761,068 A | * | 6/1998 | Nakata | 700/184 |
| 5,827,020 A | * | 10/1998 | Fujita et al. | 409/80 |
| 6,266,572 B1 | * | 7/2001 | Yamazaki et al. | 700/173 |
| 6,438,446 B1 | * | 8/2002 | Trachier | 700/180 |
| 6,597,968 B2 | * | 7/2003 | Matsumoto et al. | 700/188 |

FOREIGN PATENT DOCUMENTS

JP 61-030355 12/1986

OTHER PUBLICATIONS

Statement Concerning Offering of Publication for priority application JP 2000–402444 dispatched Feb. 12, 2003 (original Japanese and English translated copies).
Japan Society for Precision Engineering: Hokkaido Affiliated Society Academic Lecture Presentation, Aug. 21, 1999, table of contents and pp. 14–15 (original Japanese and English translated copies).

* cited by examiner

Primary Examiner—Erica Cadugan
(74) Attorney, Agent, or Firm—Brooks Kushman P.C.

(57) ABSTRACT

A cutting machine control determines a required stock-removal amount from a work for each of sections into which a tool path is divided, and feeds the rotating cutting tool at a speed that is controlled according to the required stock-removal volume so that the rotating cutting tool removes a predetermined or target stock-removal volume of material for the component path section from a work per unit time.

6 Claims, 8 Drawing Sheets

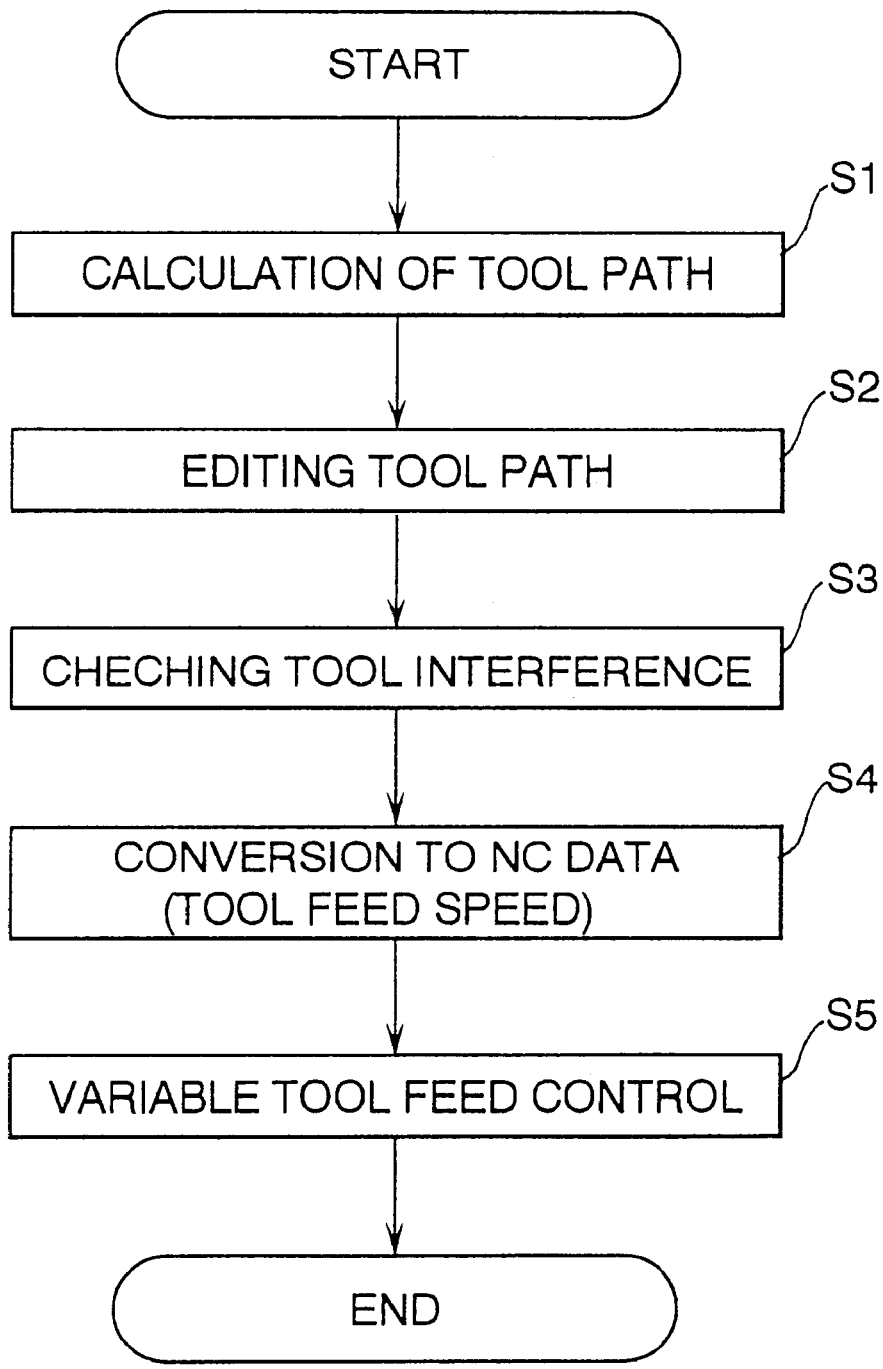

METHOD FOR CONTROLLING CUTTING MACHINE

BACKGROUND OF THE PRESENT INVENTION

1. Field of the Invention

The present invention relates to a method and a system for controlling a numerical control cutting machine for cutting a work.

2. Description of Related Art

It is common for cutting operation such as numerically controlled cutting operation to feed a rotating cutting tool on a cutting surface of a metal work along a specified path. During the cutting operation, the rotating cutting tool possibly encounters a change in cutting load. In order, for example, to cut an object work having a number of free curved surfaces such as a metal mold for press-forming a body component of a vehicle, it is popular to use a ball end mill as a three-dimensional rotating cutting tool. Even this ball end mill is apt to be so often applied with load in excess.

In order for the rotating cutting tool to be free from being applied with cutting load in excess, it is conventionally practiced to control a relative feed speed of the rotating cutting tool according to a change in cutting load that is detected during cutting. It has been proposed in, for example, Japanese Unexamined Publication No. 61-30355 to prevent cutting edges of a rotating cutting tool from being damaged due to an excessive cutting load. This is realized by starting adaptive control in response to detection of contact of the rotating cutting tool with an object work and reducing a tool feed speed at a start of the adaptive control.

It is advantageous to protection of a rotating cutting tool from being applied with cutting load in excess to vary the tool feed speed according to cutting load during cutting operation. However, although the cutting load is detected by monitoring a load current on a main spindle motor, the load current is affected by various factors, so that it is hard to regard the load current as representing true cutting load and, in consequence, it is hard to securely protect the rotating cutting tool from being applied with cutting load in excess. Further, regarding the NC machining systems, cutting is performed under the control of program telling a cutting procedure, a tool path, cutting conditions and the like. This makes it hard to change control variables according to a change in load current during cutting. Therefore, in order to prevent the rotating cutting tool from being damaged, it is essential to set a constant tool feed speed so as to fit part of an object work where the rotating cutting tool is applied with heaviest cutting load. In this case, the rotating cutting tool is fed at a comparatively low tool feed speed even over part of the object work where the rotating cutting tool is applied with light cutting load.

SUMMARY OF THE INVENTION

It is therefore an object of the present invention to provide a method for controlling a numerical control cutting machine which can prolong service life of a rotating cutting tool by preventing the rotating cutting tool from being applied with loaded in excess.

It is another object of the present invention to provide a method for controlling a numerical control cutting machine that can save cutting time.

The aforesaid objects of the present invention is achieved by a cutting machine control method of controlling a numerical control cutting machine equipped with a rotating cutting tool, such as a ball end mill, for cutting a surface of a work.

According to an aspect of the present invention, the cutting machine control determines a required stock-removal volume to be removed from an object work along a tool path on the basis of a blank configuration of the object work and variably controls a tool feed speed of the rotating cutting tool along the tool path according to the required stock-removal volume so that the rotating cutting tool removes a predetermined stock-removal volume of material from the object work per unit time.

Because the stock-removal volume of rotating cutting tool per unit time is substantially proportional to cutting load applied to a rotating cutting tool, it is not too much to say that observing a stock-removal volume of the rotating cutting tool per unit time is equivalent to observing a cutting load indirectly. As the cutting machine control of the invention controls a tool feed speed so that a stock-removal volume becomes a specified or target stock-removal volume, when the target stock-removal volume is appropriately established, the rotating cutting tool is prevented from being applied with a cutting load in excess. This contributes to a long service life of the rotating cutting tool. That is, to bring a stock-removal volume per unit time to the predetermined stock-removal volume implies a change in tool feed speed according to a required stock-removal volume from a work along a tool path. Therefore, each cutting edge of the rotating cutting tool is prevented from being applied with a cutting load in excess by decreasing a tool feed speed for part of the work that has a large required stock-removal volume. In addition, the rotating cutting tool is fed at an increased tool feed speed for part of the work that has a small necessary stock-removal volume, this contributes to making a cutting time for the entire pan of a work as short as possible.

According to another aspect of the present invention, the cutting machine control determines a required stock-removal volume to be removed from an object work along a tool path on the basis of a blank configuration of the object work and variably controls a tool feed speed of the rotating cutting tool along the tool path according to the required stock-removal volume so that the rotating cutting tool removes a predetermined stock-removal volume of material from the object work per one revolution.

Because the stock-removal volume of cutting edge per one revolution is substantially proportional to cutting load applied to a cutting edge, it is not too much to say that observing a stock-removal volume of one cutting edge per one revolution is equivalent to observing a cutting load applied to the cutting edge indirectly. When controlling fir tool feed speed of the rotating cutting tool so that the cutting edge removes the specified stock-removal volume per one revolution, there occurs no significant difference in cutting load applied to one cutting edge irrespective of differences in the number of cutting edge and/or speed of rotation of the of the rotating cutting tool. Therefore, each catting edge of the rotating cutting tool is prevented from being applied with a cutting load in excess irrespective of the number of cutting edges and speed of rotation of the rotating cutting tool. This contributes to a long service life of the rotating cutting tool In addition, the rotating cutting tool is fed at an increased tool feed speed for part of the work that has a small necessary stock-removal volume, it is prevented that a cutting time for the entire work is made long.

The required stock-removal volume may be determined for each of a plurality of component path sections into which the whole length of the tool path is divided. In this event, the rotating cutting tool is fed at a constant tool feed speed along the component path section so that the rotating cutting tool removes the required stock removal volume from the object work for the component path section when the rotating cutting tool cuts the object work along each the component path section with the predetermined stock-removal rate per unit time.

The rotating cutting tool is fed at a constant tool feed speed over each component path section but not over the entire tool path. The rotating cutting tool is slowed down for a component path section along where the required stock removal volume is large and speeded up for a component path section where the required stock removal volume is small. This contributes to making a cutting time for the entire part of a work as short as possible.

In the case where an end mill or end mills are used, when the end mill is fed to approach a cutting surface of the object work at a tool feed angle with respect to the cutting surface in the component path section, the component path section is divided into a plurality of subsections and the rotating cutting tool is fed at a tool feed speed that is decreasingly varied in steps for each the subsection, the subsection being shorter in length for the tool feed angle of 90° than for the tool feed angle other than 90°.

The circumferential speed a chamfer of the rotating end mill falls smaller as a distance from the axis decreases and comes to zero at the center and, in consequence, the cutting performance is lower at the center than the periphery 1 edge. This implies that when vertically feeding the end mill to a cutting surface of a work at a relatively high feed speed, the cutting edges are applied with excessively high cutting load when coming into contact with the cutting surface. This leads to damages and/or breakage of the cutting edges. Whereas, the cutting machine control of the present invention gradually decelerates the rotating cutting tool in steps while the rotating cutting tool is vertically fed with respect to a cutting surface of a work, so as to prevent the cutting edges being applied with cutting load in excess when the cutting edges are brought into contact with the cutting surface and thereafter.

The tool feed speed for an instant component path section may be replaced with the tool feed speed for the preceding component path section when a rate of tool feed speed change for the instant component path section relative to the tool feed speed for the preceding component path section is smaller than a specified rate.

The required stock-removal volume for a component path section that is determined on the basis of information on cutting surface configuration of a work possibly includes an error. In addition, when the tool feed speed varies for each component path section, while the control of tool feed speed becomes somewhat troublesome, movement of the cutting machine (the rotating cutting tool and/or a work) is not always smooth and cutting loading applied to the rotating cutting tool at a point where the tool feed speed changes suddenly. This not only increasing a cutting time but also applies the rotating cutting tool with a cutting load in excess. As a result, the cutting surface roughed and cutting accuracy is lowered. Whereas, the cutting machine control of the present invention continues cutting without changing a tool feed speed when a rate of tool feed speed change is low. As a result of this, the cutting machine control is simple and prevents the cutting machine from being jerky in operation that realizes cutting stability.

The specified rate of tool feed speed change may be changed larger with an increase in the tool feed speed for the previous component path section, Specifically, part of a work for which the rotating cutting tool is fed at a lower tool feed speed applies the rotating cutting tool with a light cutting toad and provides an ignorable change in cutting load only even when the rotating cutting tool is actually fed at a speed different from the determined tool feed speed. In this point of view, the cutting machine control controls a change in tool feed speed as small as possible by increasing the specified rate of tool feed speed change while the tool feed speed is high with an aim to provide cutting stability. From the other way, part of a work for which the rotating cutting tool is fed at a higher tool feed speed applies the rotating cutting tool with a heavy cutting load and provides a large change in cutting load when the rotating cutting tool is actually fed at a speed different from the determined tool feed speed. In light of this, the cutting machine control controls precisely the tool feed speed while the tool feed speed is low.

The cutting machine control system of the present invention comprises means for determining a required stock-removal volume to be removed from an object work along a tool path on the basis of data on the tool path and data on a blank configuration of the object work and means for determining a tool feed speed of the rotating cutting tool along the tool path according to the required stock-removal volume so that the rotating cutting tool removes a predetermined stock-removal of material from the object work volume per unit time, and means for feeding the rotating cutting tool at the tool feed speed.

The cutting machine control system prevents the rotating cutting tool from being applied with a cutting load in excess while making it possible to make a cutting time for the entire part of a work as short as possible. This contributes to a long service life of the rotating cutting tool.

A control medium for use with the cutting machine control method and system is recorded with a computer program to execute the functions of routing a tool path along which the rotating cutting tool is fed to cut an object work, dividing the tool path into a plurality of component path sections determining a required stock-removal volume to be removed from an object work for each the component path section on the basis of the information on the tool path and information of a blank configuration of the object work and a tool feed speed of the rotating cutting tool along the component path section according to the required stock-removal volume so each cutting edge of the rotating cutting tool removes a predetermined stock-removal volume of material from the subject work per one revolution of the rotating cutting tool, and storing data of the tool feed speed of the rotating cutting tool for each the component path section.

Data on the tool fed speed can be provided using the recording medium by entering information on rotating cutting tools, works, a tool path and a blank configuration of a cutting surface of the work into the computer.

BRIEF DESCRIPTION OF THE DRAWINGS

The above and other objects and features of the present invention will be clearly understood from the following detailed description when read with reference to the accompanying drawings, in which:

FIG. 2 is a flow chart illustrating a sequence routine of control performed in a computer aided manufacturing system forming part of the cutting machine control system;

DETAILED DESCRIPTION OF THE PREFERRED EMBODIMENTS

Figure 1:
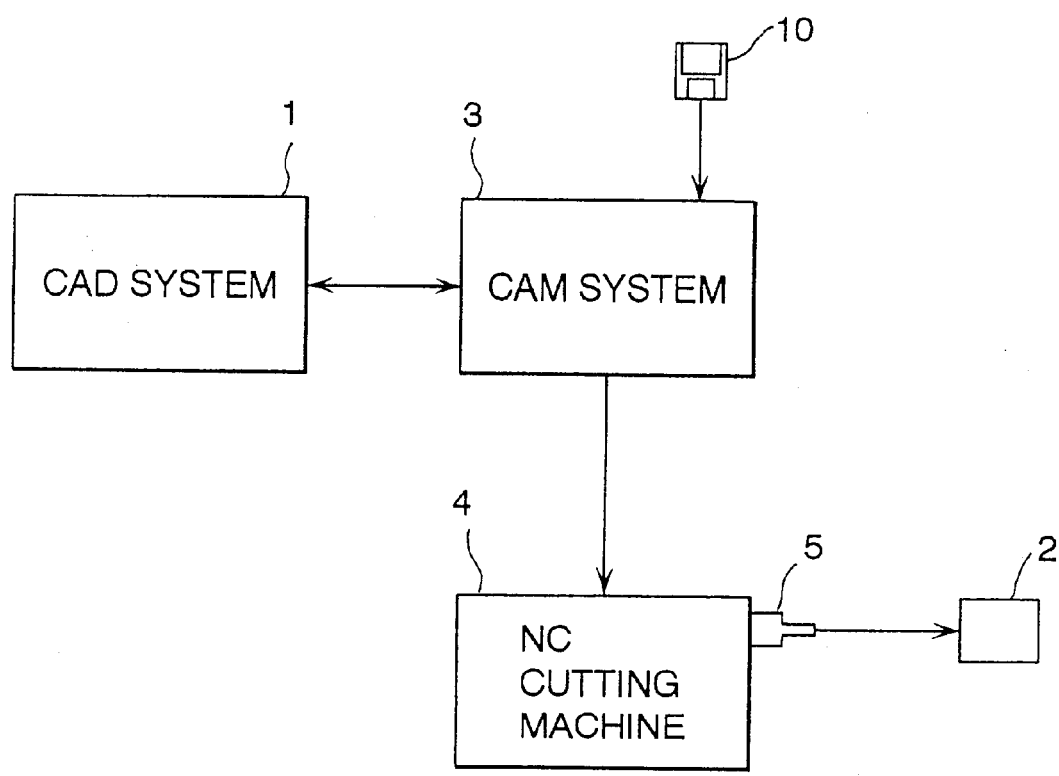
FIG. 1 is a block diagram illustrating a cutting machine control system according to an embodiment of the present invention.

Referring to the drawings in detail and, in particular, to FIG. 1 schematically showing a cutting machine control system 100 according to an embodiment of the present invention, the cutting machine control system 100 comprises a computer-aided design (CAD) system 1, a computer-aided manufacturing (CAM) system 3 and a numerical control (NC) cutting machine such as a numerical control (NC) milling machine 4 equipped with a rotating cutting tool or rotating cutting tools such as ball end mills 5. The CAD system 1 creates data on a configuration of a model (CAD data) of an object work 2 such as a metal mold. The CAM system 3 reads in the CAD data from the CAD system 1. The CAM system 3 in turn performs, on the basis of the CAD data, a determination of a tool path along which a rotating ball end mill 5, such as a roughing ball end mill, a finishing ball end mill and a small diameter ball end mill, is muted to cut the object work 2, creation of rotating cutting tool location data (CL data), transcription of the CL data into a form adapted for the NC milling machine 4 (NC data), setting of a tool feed speed on the basis of the NC data and information on the object work 2 such as blank configuration of the object work 2 (work data), and preparation of instructions that are sent to the NC milling machine 4. The NC milling machine 4 executes the instructions to perform cutting operation for the object work 2.

Referring FIG. 2 illustrating a process that is executed in the CAM system 3, when the CAM system 3 fetches the CAD data from the CAD system 1 step S1, the CAD data is processed to determine and edit tool paths for the respective ball end mills 5 at step S2. Subsequently, the tool path data is reedited if there is a mechanical interference of the ball end mill 5, namely a roughing ball end mill, a finishing ball end mill and a small diameter ball end mill, with the object work 2 at step S3. This routing test is carried out on a monitor screen by moving the respective ball end mill 5 tool along the edited tool path on a display and checking whether the main spindle causes the mechanical interference with the object work 2 on the display.

The tool path data is converted in format into NC data that meets the NC milling machine 4 and its control system at step 54. Before performing the data conversion, the tool path data is preprocessed by incorporating various factors. The factors include, for example, an approach of the respective ball end mill 5 to a cutting position, tool and location priority, cutting conditions, a pick-feed height (which is referred to as a tool pat height to which a ball end mill 5 is lifted up and fed between separate areas for cutting or aver an area unnecessary to be cut), deletion of useless movement of a ball end mill 5, tool exchange positions at which ball end mills 5 which are applied to complete cutting of the object work 2 are exchanged from one to another, reading information necessary to prepare the instruction from the CL data and listing them, and the like. The term "tool and location priority" as used herein shall mean and refer to that the priority is given to a ball end mill 5 having the a tool length longer than other ball end mills 5, and to locations on the tool paths at which the same ball cad mill is scheduled to be used.

Thereafter, a tool feed speed of the respective cutter is set by simulating movement of the ball end mill 5 on the monitor screen on the basis of the NC data and the work data of the object work 2 at step S5. The instruction is prepared on the basis of the prepared information on the ball end mill 5 and the cutting priority and the information converted from the NC data.

The setting of a tool feed speed at step S5 is set under the control of a program down loaded into the CAM system 3 from a computer readable data medium 10 such as a floppy disk and a compact disc.

Figure 3A:
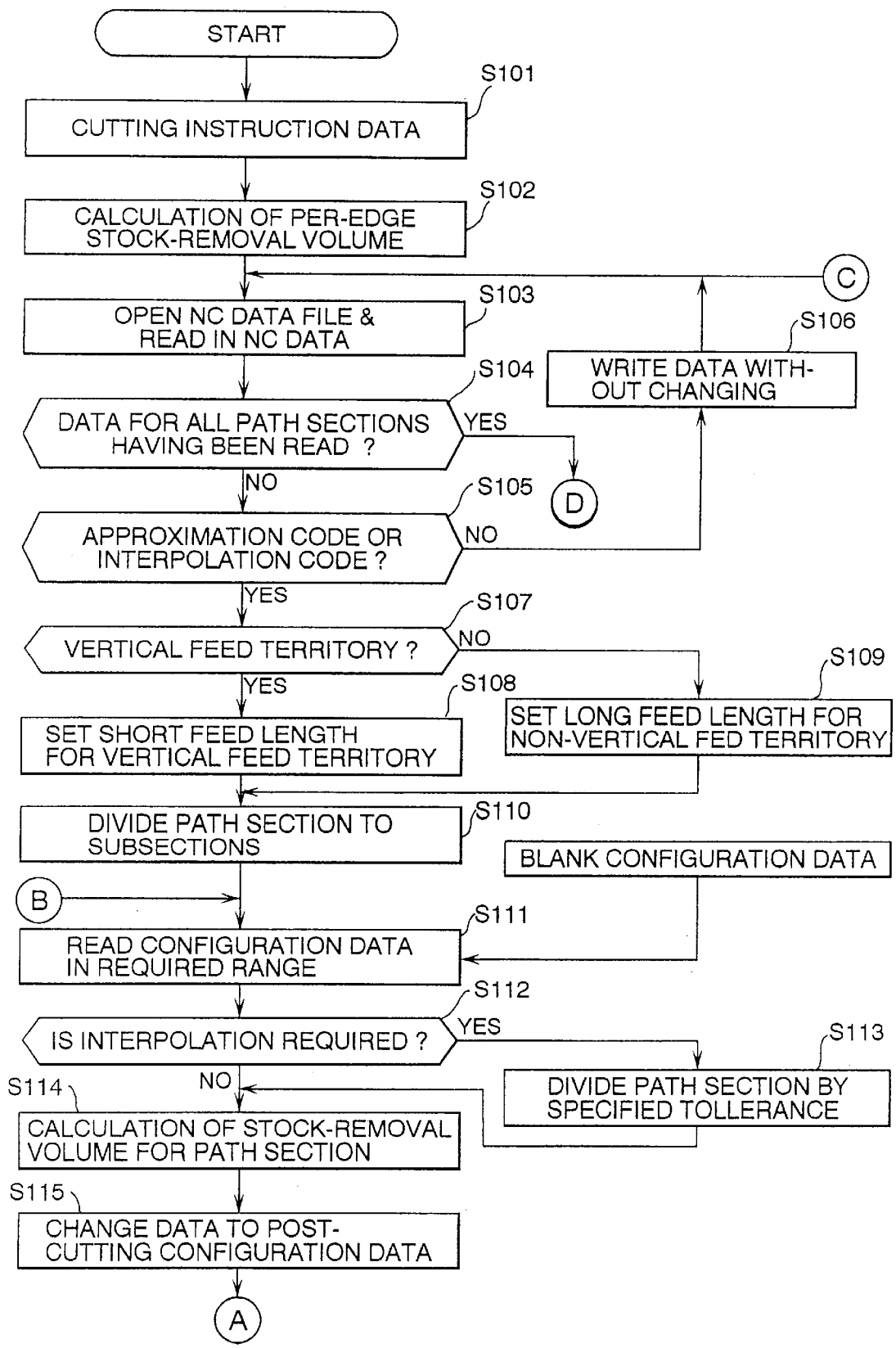
FIGS. 3A and 3B are respective part of a flow chart illustrating a sequence routine of tool feed speed setting control.
Figure 3B:
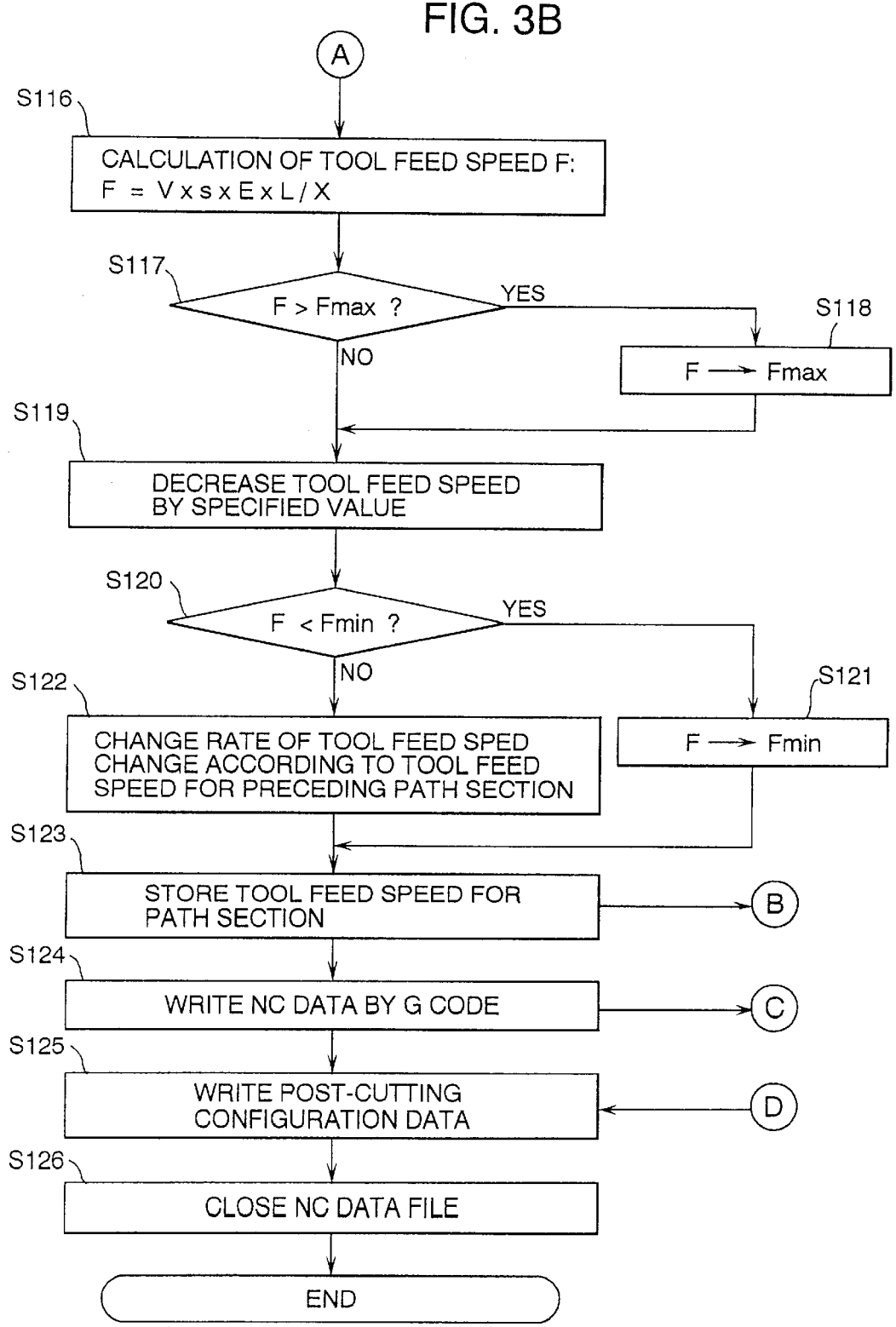

Referring to FIGS. 3A and 3B which show respective parts of a flow chart illustrating a programmed tool feed speed control sequence routine, when the sequence logic commences, the CAM system 3 opens a cutting instruction data file and retrieves data on NC data name, work material and cutting tools at step S101. Subsequently, a calculation is made at step S102 to determine a volume of material to be removed from the subject work 2 by one cutting edge of an applied ball end mill 5 for one revolution (which is referred to as a specified per-edge stock-removal volume) V by multiplying a reference per-edge stock-removal volume VB by a work coefficient V1 and a tool coefficient V2. In this instance, the reference per-edge stock-removal volume VB is predetermined as a volume of material to be removed from a reference work having specific material and hardness when the reference work is cut by a reference milling tool having a ratio of tool overhang length to tool diameter (L/D value). Work coefficients V1 are predetermined for various works having different materials and hardness. Tool coefficients V2 are predetermined for various ball end mills having L/D values different in steps. These work coefficients V1 and tool coefficients V2 are optimized in terms of tool life and cutting time. On, of the predetermined work coefficients V1 is selected suitably for material and hardness of the object work 2. One of the tool coefficients V2 is selected suitably for an applied ball end mill 5.

Figure 4:
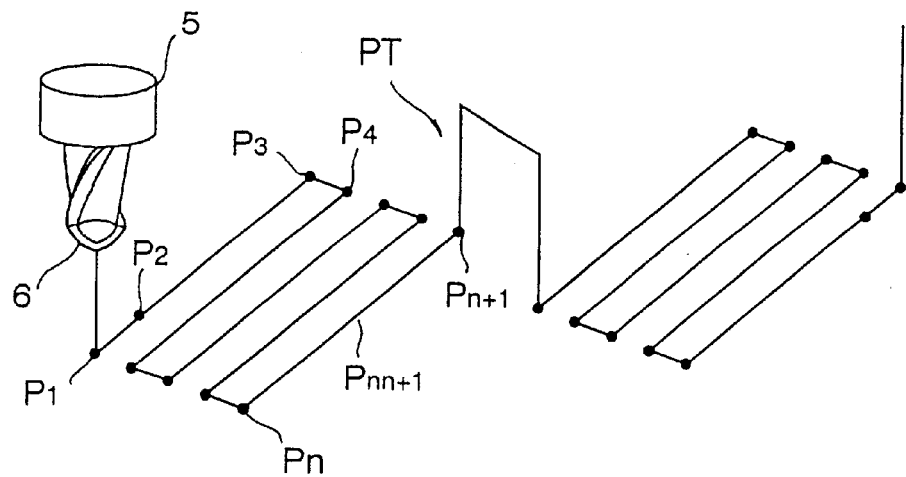
FIG. 4 is an illustration showing a tool path defined by NC data component points.
Figure 5:
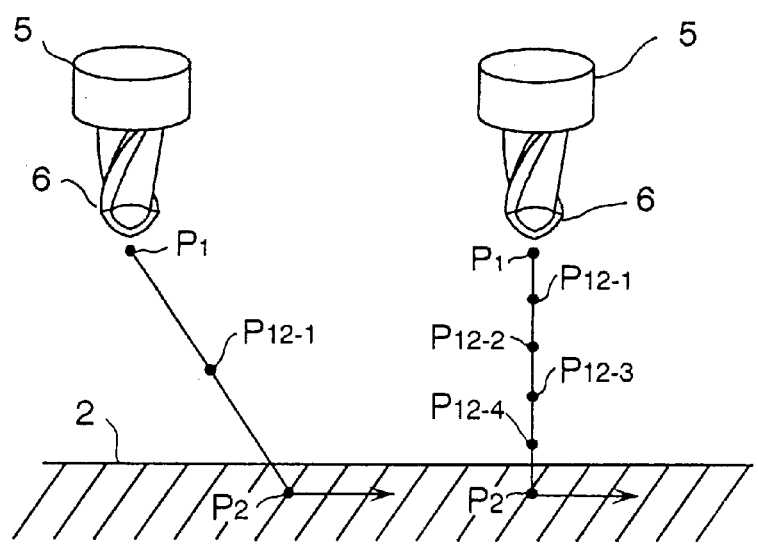
FIG. 5 is an explanatory view showing how to divide a component path section into subsections for vertical feed territory and non-vertical feed territory.

Subsequently, the NC data file is opened and NC data for each data component point that is shown by a dot Pn in FIG. 4 is read in at step S103. As shown in FIG. 4 by way of example, data component points Pn determine a tool path PT along which the ball end mill 5 having a cutting edge 6 is routed. Each adjacent data component points Pn and Pn+1) determines a component path section Pnn+1 therebetween. The entire tool path PT is divided into a number of component path sections. A decision is subsequently made at step S104 as to whether the NC data for all of the data component points have been read in or not. If the answer is negative, then another decision is made at step S105 whether the component path section defined between the data component point Pn and the preceding data component point Pn+1 is specified by approximation or interpolation code such as a linear approximation code G1, an arc interpolation code G2 or G3, and an NURBS (Non-Uniform Rational B-Spline) interpolation code G6.2. When the answer is negative, this indicates that neither interpolation nor approximation is applied to the component path section, after writing the NC data as it is at step S106, the NC data for a next component data point is read in at step S103. On the other hand, when the answer is affirmative, this indicates that the component path section defined between the instant data component point and the preceding data component point is specified by one of the approximation and interpolation codes, then a further decision is made at step S107 as to whether the component path section is a vertical feed territory in which the ball end mill 5 is fed to approach the object work 2 remaining vertical in position with respect to a cutting surface of the subject work 2. When the answer is affirmative, a small dividing feed length is set for vertical tool feed territory at step S108. On the other hand, when the answer is negative, this indicates that the component path section is one of non-vertical tool feed territories in which the ball end mill 5 is fed toward the object work 2 at an angle greater or smaller than a right angle with respect to a cutting surface of the subject work 2, then a large dividing length is set for non-vertical tool feed territory at step S109. After setting a dividing length at step S105 or S109, the component path section is segmented into subsections having the dividing length at step S110. That is, as shown in FIG. 5, a vertical feed component path section P12 is divided into comparatively short length subsections by dividing points P12-1, P12-2, P12-3 and P12-4. On the other hand, the non-vertical feed component path section P12 is divided into comparatively long length subsections by a dividing point P12-1. The reason for setting a comparatively long dividing length for the vertical feed component path section is that the number of subsections is increased so that the ball end mill 5 is decelerated in feed speed.

Figure 6:
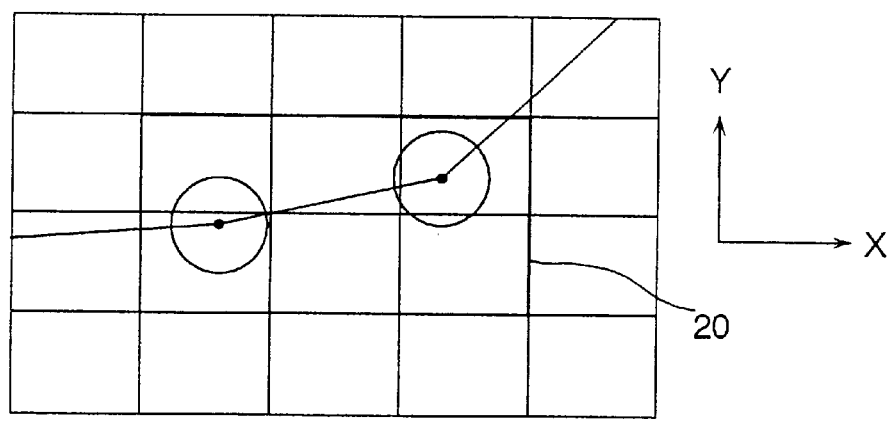
FIG. 6 is an illustration showing an area map.

At step S111, data on a blank configuration of the object work 2 in a required range is read in. Specifically, when an available memory capacity is exceeded by the blank configuration necessary read in (X and Y axes) for calculation of tool feed, while the blank configuration data unnecessary for the calculation of tool feed is written, the blank configuration data in a limited range 20 necessary for the calculation of tool feed is read in as shown in FIG. 6. Limiting the range of blank configuration data makes it easy to add header information and elemental mapping information with an effect of easily reading out Z-axis values As is well known as what is called Z-map in the art, the work configuration data comprises a set of elemental Z map data. The work configuration can be determined by values in X axis.

Subsequently, a decision is made at step S112 as to whether the subsection is one that requires the arc interpolation or the NURBS interpolation. When the answer is affirmative, then the subsection is further segmented by a specified tolerance at step S113. That is, a curved subsection is approximated by a zigzag line defined by connecting respective dividing points by linear lines, respectively. In other words, the curved subsection is approximated by a chain of a plurality of linear segments. This approximation simplifies the calculation of required stock-removal volume X for the curved subsection as will be described below.

Figure 7:
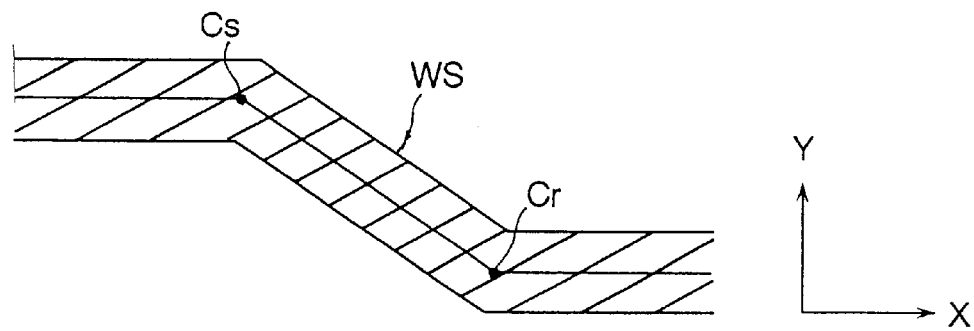
FIG. 7 is an explanatory view showing part of a cutting surface of a work that is inclined.
Figure 8:
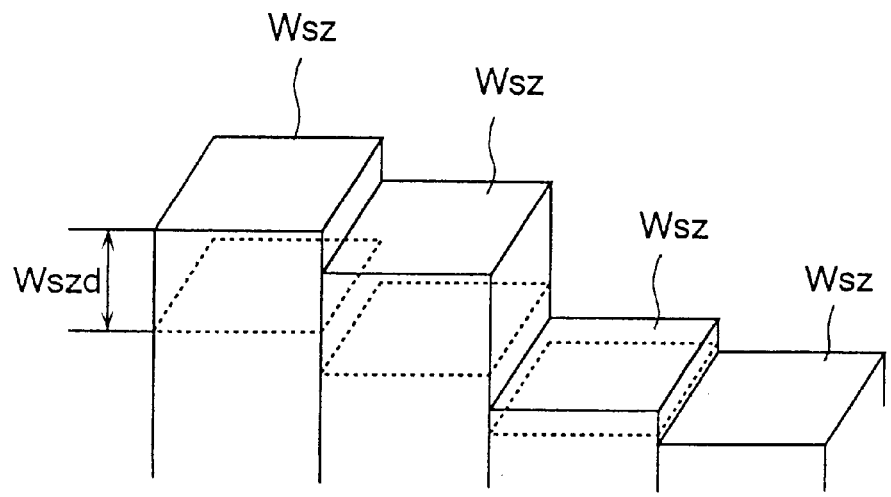
FIG. 8 is an explanatory view showing how calculating a required stock-removal volume for an inclined cutting surface of a work.

When the answer to the decision is negative at step S112 or after segmenting the curved subsection at step S113, a calculation is made at step S114 to determine a required stock-removal volume X for the subsection on the basis of the tool path and the blank configuration of the object work 2. In the case where the subsection WS has a slanting cutting surface with a vertical level difference in Z axis between a starting point of cutting Cs and a terminal point of cutting Ct as shown in FIG. 7, the required stock-removal volume X for the subsection is approximated by a total stock-removal volume of horizontal segmental zones. That is, the subsection WS is segmented in steps into a plurality of horizontal segmental zones Wsz for the purpose of approximating the required stock-removal volume X for the subsection as shown in FIG. 8. The stock-removal volume for each horizontal segmental zone Wsz is calculated by multiplying the surface area of the segmental zone Wsz by a difference Wszd between heights in X-axis of the horizontal segmental zone Wsz before and after cutting. Thereafter, the resultant data is altered to data on a configuration of object work 2 after cutting (post-cutting configuration data) at step S115. The post-cutting configuration data is used to set a tool feed speed for another ball end mill when the subsection is cut using the other cutter.

As shown in FIG. 3B, a calculation is made to determine a tool feed speed F (mm/min) that achieve the specified per-edge stock-removal volume V. The tool feed speed F is given by the following equation:

$$F = V \times S \times E \times L / X$$

where V is the specified per-edge stock-removal volume ($mm^3$);

S is the speed of rotation of a ball end mill (rpm);

E is the number of cutting edges of a ball end mill;

L is the length of a subsection (mm);

X is the required stock-removal volume for a subsection ($mm^3$).

Subsequently, at step S117, a decision is made as to whether the tool feed speed F exceeds a specified maximum tool feed speed Fmax. When the answer is affirmative, then the tool feed speed F is replaced with a specified maximum tool speed Fmax at, step S118. The maximum tool feed speed Fmax is employed in order to limit the tool feed speed in light of durability of a ball end mill and milling machine performance. When the answer to the decision made at step S117 is negative, this indicates that the tool feed speed F is smaller than the specified maximum tool feed speed Fmax, or after replacing the tool feed speed F wit the maximum tool feed speed Fmax at step S118, the tool feed speed F is reduced in steps by a specified value at step S119 if the subsection is a vertical feed territory. That is, the tool feed speed F is reduced at each of the dividing points, so as to be decelerated in steps while the ball end mill 5 is fed over the vertical feed subsection. This prevents the ball end mill 5 from being damaged due to vertical penetration into the object work 2 at a high feed speed.

Figure 9:
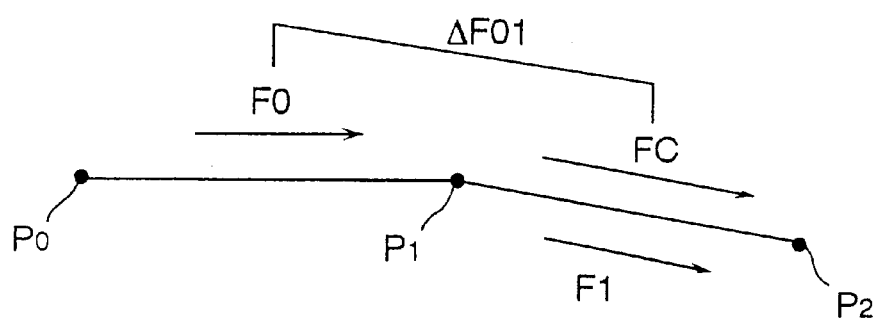
FIG. 9 is an illustration showing a correction of tool feed speed.

At subsequent step S120, a decision is made as to whether the tool feed speed F exceeds a specified minimum tool feed speed Fmin. When the answer is negative, then the tool feed speed F is replaced with the minimum tool speed Fmin at step S121. The minimum tool feed speed Fmin is employed in order to prevent the NC milling machine 4 from vibrations that possibly occur due to too low tool feed speeds. When the answer to the decision made at step S120 is affirmative, this indicates that the tool feed speed F is higher than the minimum tool feed speed Fmin, or after replacing the tool feed speed F with the minimum tool speed Fmax at step S121, the tool feed speed F is corrected with respect to a tool feed speed employed for the preceding subsection at step S122. Specifically, as shown in FIG. 9, letting F0 and FC be the tool feed speed employed for the preceding subsection P0-P1 and the tool feed speed for the instant subsection P1-P2, respectively, when a rate of tool feed speed change K, which is expressed by K=ΔF01/F0=□F0−FC□/F0, is greater than a specified rate of tool feed speed change $K_0$, the calculated tool feed speed FC is employed as an instant tool feed speed F1 for the instant subsection P1-P2. However, when the rate of tool feed speed change K is less than the specified rate of tool feed speed change $K_0$, then the tool feed speed F0 employed for the preceding subsection P0-P1 is employed as a tool feed speed F1 for the instant subsection P1-P2. This alteration of tool feed speed F prevents the stool feed speed control from becoming troublesome and the NC milling machine 4 from being jerky in operation. In consequence, the tool feed speed control realizes cutting stability of the NC milling machine 4. The specified rate of tool feed speed change $K_0$ is changed greater as the tool feed speed F0 employed for the preceding subsection P0-P1 becomes higher. As a result of this, regarding light cutting load part of an object work which has a demand for a comparatively high tool feed speed, cutting load does not greatly change even though the tool feed speed F is somewhat different from the calculated tool feed speed FC. This negligence in tool feed speed difference rather leads to prevention of a change in tool feed speed, so as to be advantageous to secured cutting stability. On the other hand, regarding heavy cutting load part of a work that which has a demand for a comparatively low tool feed speed, the tool fed speed F is precisely controlled according to a change in the calculated tool feed speed FC. This prevents the cutting edges of the ball end mill 5 from being applied with cutting loaded in excess.

After retaining data of the tool feed speed F determined for the subsection in the memory at step S123, the sequence logic repeatedly proceeds through steps S111 to S123 until having determined and retained tool feed speeds F for all of respective subsections of one component path section. Subsequently, the NC data is written by G code at step S124. Thereafter, the sequence logic repeatedly proceeds through steps S103 to S124 until having determined and retained tool feed speeds F for all of the component path sections. When it is judged at step S103 that all of the NC data have been read to the end of the file, i.e. when the answer to the decision made at step S103 is affirmative, then after writing the post-cutting configuration data at step S125, the NC data file is closed at step S126 and then the sequence logic goes to end.

The instruction in which the tool feed speeds F has been determined for the subsections of the respective component path sections is loaded to the NC milling machine 4. The NC cutting machine 4 performs cutting operation by feeding the ball end mill 5 at a controlled tool feed speed along the tool path so as to remove a target or specified stock-removal volume, that is defined by volume V×S×E, from the object work 2 per unit time.

Figure 10A:
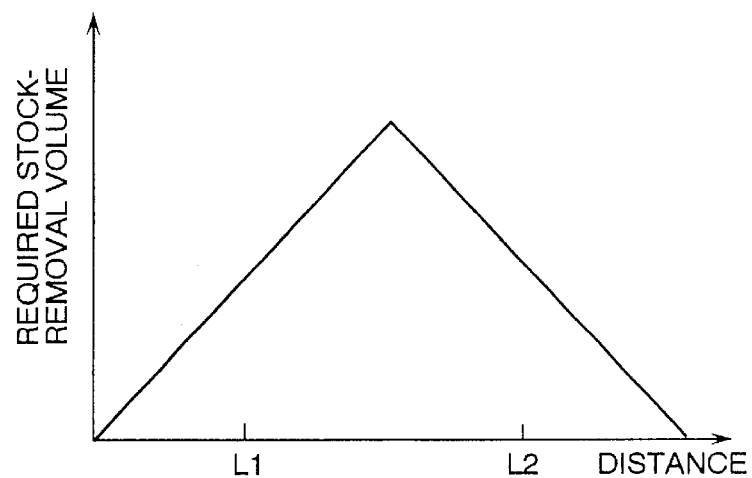
FIG. 10A is a diagram showing a required stock-removal volume with respect to a tool path.
Figure 10B:
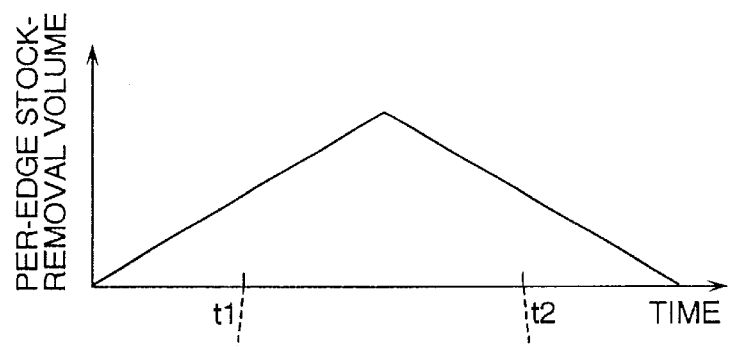
FIG. 10B is a diagram showing a per-edge stock-removal volume with respect to cutting time.

Specifically, in case where an object work has a peak of a required stock-removal volume X in a section L1-L2 of a tool path as shown in FIG. 10A, if feeding the ball end mill 5 at a constant tool feed speed, the per-edge stock-removal volume reaches a peak correspondingly to the peak of the required stock-removal volume X between times t1 and t2 which correspond to opposite extremities of the section L1-L2 as shown in FIG. 10B. Accordingly, the ball end mill 5 is temporarily applied with cutting load in excess.

Figure 10C:
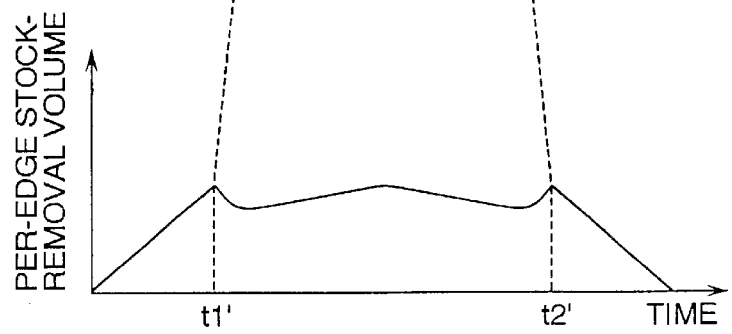
FIG. 10C is a diagram showing a per-edge stock-removal volume with respect to cutting time when the rotating cutting tool is fed at a constant speed.

As against, according to the tool feed speed control of milling machine of the present invention, as shown in FIG. 10C, the ball end mill 5 is fed at a comparatively high tool feed speed in sections L0-L1 and L2-L3 of the tool path where the required stock-removal volume is comparatively small. However, the ball end mill 5 is fed at a comparatively low tool feed speed between times t1' (<t1) and t2' (>t2). which correspond to the opposite extremities of the section L1 and L2. As apparent, a peak of the per-edge stock-removal volume of the ball end mill 5 is lowered. This prevents the ball end mill 5 from being applied, temporarily or continuously, with cutting load in excess.

Further, according to the tool feed speed control of milling machine of the present invention, because the tool feed speed F is determined on the basis of the per-edge stock-removal volume V per one revolution that is determined according to material and hardness of an object work and an L/D value of an applied ball end mill, the per-edge stock-removal volume V is invariable irrespective of the number of edges E and/or the speed of rotation S of the applied ball end mill, in other words, irrespective of the per-edge stock-removal volume per unit time of the applied ball end mill. Therefore, the applied ball end mill is prevented from being applied with cutting loaded in excess.

The ball end mill 5 can be any rotating mills including an edge mill as well as a ball end mill.

It is to be understood that although the present invention has been described with regard to a preferred embodiment thereof, various other embodiments and variants may occur to those skilled in the art, which are within the scope and spirit of he invention, and such other embodiments and variants are intended to be covered by the following claims.

What is claimed is:

1. A cutting machine control method of controlling a numerically controlled (NC) cutting machine equipped with a rotating cutting tool for cutting a surface of an object work along a tool path defined on the basis of a blank configuration of said object work by NC data, said cutting machine control method comprising the steps of:
    determining a required volume of stock to be removed from said object work for each of path sections into which said tool path is divided; and
    determining a constant tool feed speed of said rotating cutting tool for each of said path sections on the basis of said required volume of stock to be removed so that said rotating cutting tool removes a target volume of stock to be removed from said object work per unit time;
    wherein, when a change rate of said determined constant tool feed speed for a current one of said path sections in cutting relative to said determined constant tool feed speed for the preceding one is lower than a specified change rate, said determined constant tool feed speed for said current path section is replaced with said determined constant tool speed for said preceding path section.

2. A cutting machine control method as defined in claim 1, wherein, in the event where an end mill is used as said rotating cutting tool, a path section along which said end mill approaches a surface of said object work is divided into a plurality of subsections and a constant tool feed speed of said end mill is gradually decreased in steps for said subsections, said subsections being shorter in length when a rotational axis of said end mill approaches said surface of said object work at a tool feed angle of 90° with respect to said surface than when said rotational axis of said end mill approaches said surface of said object work at a tool feed angle other than 90° with respect to said surface.

3. A cutting machine control method as defined in claim 1, wherein said specified change rate is increased with an increase in said constant tool feed speed for said preceding path section.

4. A cutting machine control method of controlling a numerically controlled (NC) cutting machine equipped with a rotating cutting tool having a cutting edge for cutting a surface of an object work along a tool path defined on the basis of a blank configuration of said object work by NC data, said cutting machine control method comprising the steps of:

determining a required volume of stock to be removed from said object work for each of path sections into which said tool path is divided; and determining a constant tool feed speed of said rotating cutting tool for each said path section on the basis of said required volume of stock to be removed so that said cutting edge removes a target volume of stock to be removed from said object work per one revolution, thereby removing said required volume of stock to be removed, per unit time;

wherein, when a change rate of said determined constant tool feed speed for a current one of said path sections in cutting relative to said determined constant tool feed speed for the preceding one is lower than a specified change rate, said determined constant tool feed speed for said current path section is replaced with said determined constant tool speed for said preceding path section.

5. A cutting machine control method as defined in claim 4, wherein, in the event where an end mill is used as said rotating cutting tool, a path section along which said end mill approaches a surface of said object work is divided into a plurality of subsections and a constant tool feed speed of said end mill is gradually decreased in steps for said subsections, said subsections being shorter in length when a rotational axis of said end mill approaches said surface of said object work at a tool feed angle of 90° with respect to said surface than when said rotational axis of said end mill approaches said surface of said object work at a tool feed angle other than 90° with respect to said surface.

6. A cutting control method as defined in claim 4, wherein said specified change rate is increased with an increase in said constant tool feed speed for said preceding path section.

* * * * *

UNITED STATES PATENT AND TRADEMARK OFFICE
CERTIFICATE OF CORRECTION

PATENT NO. : 6,824,336 B2
DATED : November 30, 2004
INVENTOR(S) : Yukio Izutsu et al.

It is certified that error appears in the above-identified patent and that said Letters Patent is hereby corrected as shown below:

Column 9,
Line 5, delete "☐F0 -FC☐/F0" and insert -- |F0 - FC | /F0 --.
Line 13, delete "stool" and insert -- tool --.

Column 12,
Line 17, after "cutting" insert -- machine --.

Signed and Sealed this

First Day of February, 2005

JON W. DUDAS
*Director of the United States Patent and Trademark Office*